United States Patent
Lamela et al.

(10) Patent No.: US 10,322,759 B2
(45) Date of Patent: Jun. 18, 2019

(54) TRACK BUSHING FOR ENDLESS TRACK

(71) Applicant: CNH Industrial America LLC, New Holland, PA (US)

(72) Inventors: Anthony J. Lamela, Gilberts, IL (US); Joe Sollitt, Plainfield, IL (US)

(73) Assignee: CNH Industrial America LLC, New Holland, PA (US)

( * ) Notice: Subject to any disclaimer, the term of this patent is extended or adjusted under 35 U.S.C. 154(b) by 418 days.

(21) Appl. No.: 14/794,219

(22) Filed: Jul. 8, 2015

(65) Prior Publication Data
US 2016/0009324 A1    Jan. 14, 2016

Related U.S. Application Data

(60) Provisional application No. 62/022,043, filed on Jul. 8, 2014.

(51) Int. Cl.
    *B62D 55/20*         (2006.01)
    *B62D 55/21*         (2006.01)

(52) U.S. Cl.
    CPC ........... *B62D 55/202* (2013.01); *B62D 55/21* (2013.01)

(58) Field of Classification Search
    CPC ............................. B62D 55/202; B62D 55/21
    USPC ....... 305/137, 193, 194, 195, 196, 197, 200, 305/201
See application file for complete search history.

(56) References Cited

U.S. PATENT DOCUMENTS

| | | | |
|---|---|---|---|
| 2,553,646 A | | 5/1951 | Field |
| 3,158,923 A | * | 12/1964 | Reinsma ............ B62D 55/0887 29/235 |
| 3,218,107 A | * | 11/1965 | Reinsma ............ B62D 55/0887 277/634 |
| 3,545,005 A | * | 12/1970 | Gallagher ................ B61K 9/06 246/169 D |
| 4,892,365 A | | 1/1990 | Szakacs |
| 5,755,495 A | * | 5/1998 | Cook ..................... B62D 55/24 305/122 |
| 6,082,721 A | * | 7/2000 | Kingsley ............... F16B 11/008 267/276 |
| 6,145,941 A | | 11/2000 | Anderton et al. |
| 6,206,491 B1 | | 3/2001 | Hisamatsu |
| 6,634,725 B2 | | 10/2003 | Sugiyama et al. |
| 7,240,973 B2 | | 7/2007 | Takayama |
| 7,604,304 B2 | | 10/2009 | Takayama |
| 8,100,483 B2 | * | 1/2012 | Diekevers ............ B62D 55/145 305/104 |
| 8,113,597 B2 | | 2/2012 | Grenzi |

(Continued)

FOREIGN PATENT DOCUMENTS

EP            1591350 A2     11/2005

*Primary Examiner* — S. Joseph Morano
*Assistant Examiner* — Jean W Charleston
(74) *Attorney, Agent, or Firm* — Patrick M. Sheldrake; Peter K. Zacharias

(57) ABSTRACT

An endless track assembly formed from interconnected links pivotally interconnected by a track pin having a wear sleeve. A track bushing formed from high strength steel is positioned over the wear bushing of the track pin and has an inner sleeve formed from composite bearing material either pressed in or bonded to its inner diameter. The internal diameter of the track bushing is sized so that rotation relative to the track pin surface is permitted when the track bushing is engaged by the teeth of a drive sprocket.

16 Claims, 3 Drawing Sheets

(56) References Cited

U.S. PATENT DOCUMENTS

| | | | |
|---|---|---|---|
| 8,851,583 B2* | 10/2014 | Grenzi | B62D 55/21 |
| | | | 305/103 |
| 8,991,944 B2 | 3/2015 | Hisamatsu | |
| 2002/0145336 A1* | 10/2002 | Bottom | B21L 9/08 |
| | | | 305/202 |
| 2008/0011524 A1* | 1/2008 | Despres | B62D 55/108 |
| | | | 180/9.21 |
| 2011/0058760 A1* | 3/2011 | Magnus | B65G 23/04 |
| | | | 384/280 |
| 2014/0103703 A1 | 4/2014 | Wodrich | |

* cited by examiner

TRACK BUSHING FOR ENDLESS TRACK

CROSS REFERENCE TO RELATED APPLICATIONS

This application claims the benefit of and priority to U.S. Provisional Application No. 62/022,043, filed Jul. 8, 2014, entitled TRACK BUSHING FOR ENDLESS TRACK, which is hereby incorporated by reference in its entirety.

BACKGROUND OF THE INVENTION

1. Field of the Invention

The present invention relates to endless tracks and more specifically to extended life track systems.

2. Description of the Related Art

The endless track has been incorporated in certain work machines for many years. Such an arrangement has shoes which engage the soil with a significantly larger foot print than wheels to enable significant traction and usefulness. Endless track assemblies are usually constructed with a series of pivotally interconnected links that form the structural foundation for shoes actually engaging the ground. The links also provide engagement with, among other things, a drive spoke that causes the assembly to move about its track. One of the key design features for such a system is the track pin which, while providing a pivotal interconnection for the links, also engages the teeth of the drive sprocket. Over the years, many efforts have been applied to a structure in which the track pins have extended life.

One such effort is to have rotating bushings that are positioned over the track pin and engage the teeth of the drive sprocket. The rotating track pin in extended life form involves a clearance between the track bushing and the track pin. This clearance is filled with appropriate lubricant to enable the rotation. Seals are provided at the axial ends of the track bushing to keep out dirt and other debris normally encountered in the operation of an endless track work machine. A problem with this arrangement is that dirt and other contaminants can migrate across the seal and destroy its effectiveness thereby allowing the lubricant to leak out and to eventually cause a termination of the service life. In addition to the cost of links, it is difficult to properly install such a track bushing so that it can be expected to have a reasonably extended service life.

Accordingly, what is needed in the art is a track bushing for an endless track assembly that avoids the issues associated with the prior art.

SUMMARY OF THE INVENTION

The invention seeks to provide a track bushing for an endless track assembly that is simplified, economical and easy to install.

In one form, the invention includes a track bushing for an endless track of a track type work machine. The bushing includes an outer steel sleeve with sufficient thickness and strength to resist impact loading when in use. An inner sleeve formed from composite bearing material is fixed to the outer steel sleeve and has an internal diameter sized to permit rotation of the track bushing relative to a component of the endless track over which the track bushing is positioned.

In another form, the invention is an endless track for a track type work machine including a plurality of track links arranged end to end and forming an endless track. A plurality of pins pivotally interconnect the links. A track bushing is positioned over and coaxial with each pin with the track bushing including an outer steel sleeve with sufficient thickness and strength to resist impact loading when in use. An inner sleeve formed from composite bearing material is fixed to the outer sleeve and has an internal diameter sized to permit rotation of the track bushing relative to the bearing surface of the pin over which the track bushing is positioned.

An advantage of the present invention is a track bushing that is simple in form and easy to install.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
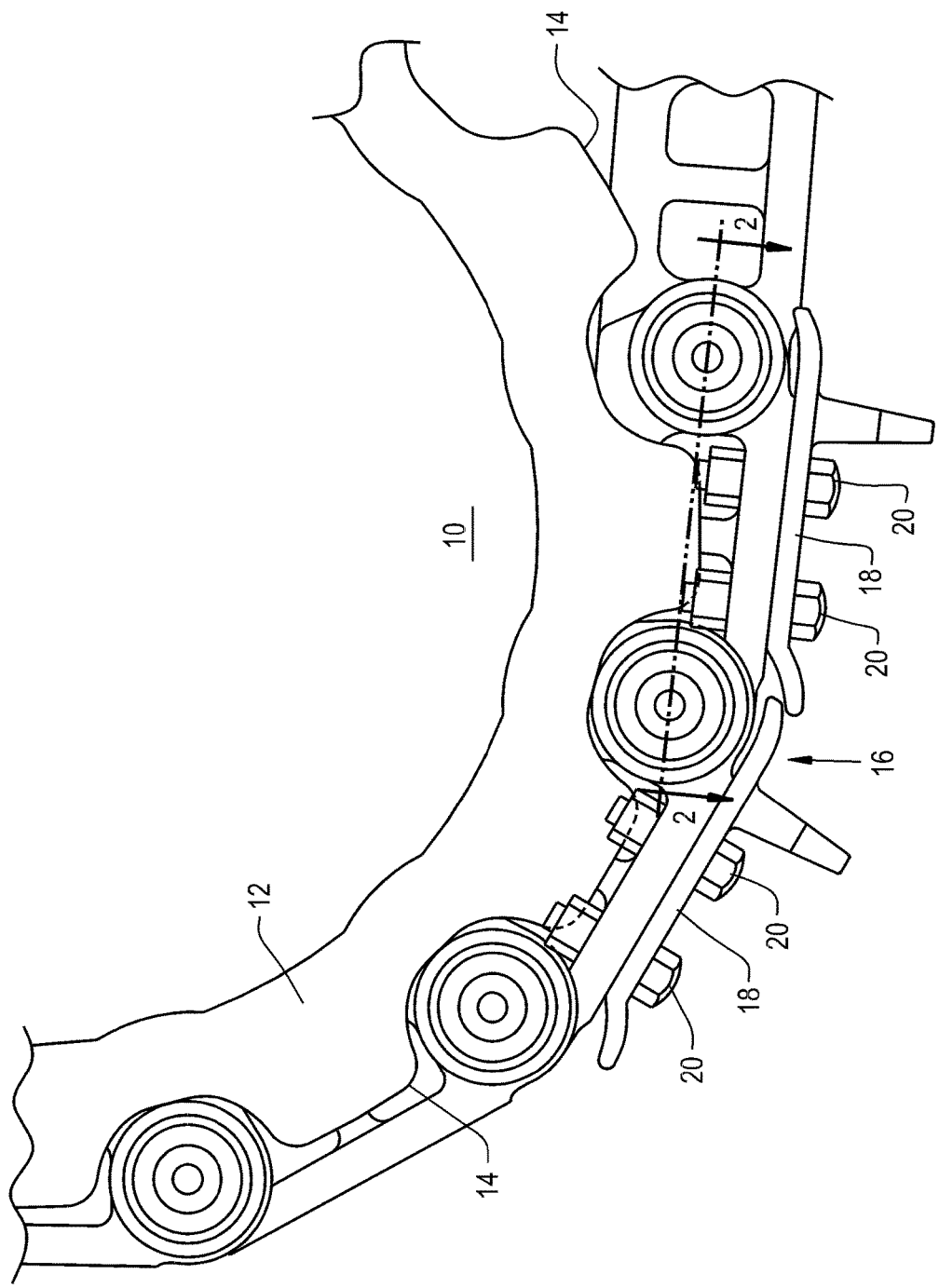
FIG. 1 shows a partial side view of an endless track assembly embodying the present invention.

Referring now to the drawings, and more particularly to FIG. 1 there is shown an endless track assembly 10 used in a work machine (not shown). The endless track assembly 10 includes, among other mechanisms, a drive sprocket 12 used to power the endless track assembly 10 in a continuous loop through drive teeth 14. The endless track 16 is driven by the teeth 14 and provides support for a plurality of shoes 18, (only two of which are shown,) that engage the ground. The shoes 18 are removably fastened to the endless track 10 by appropriate fasteners 20.

Figure 2:
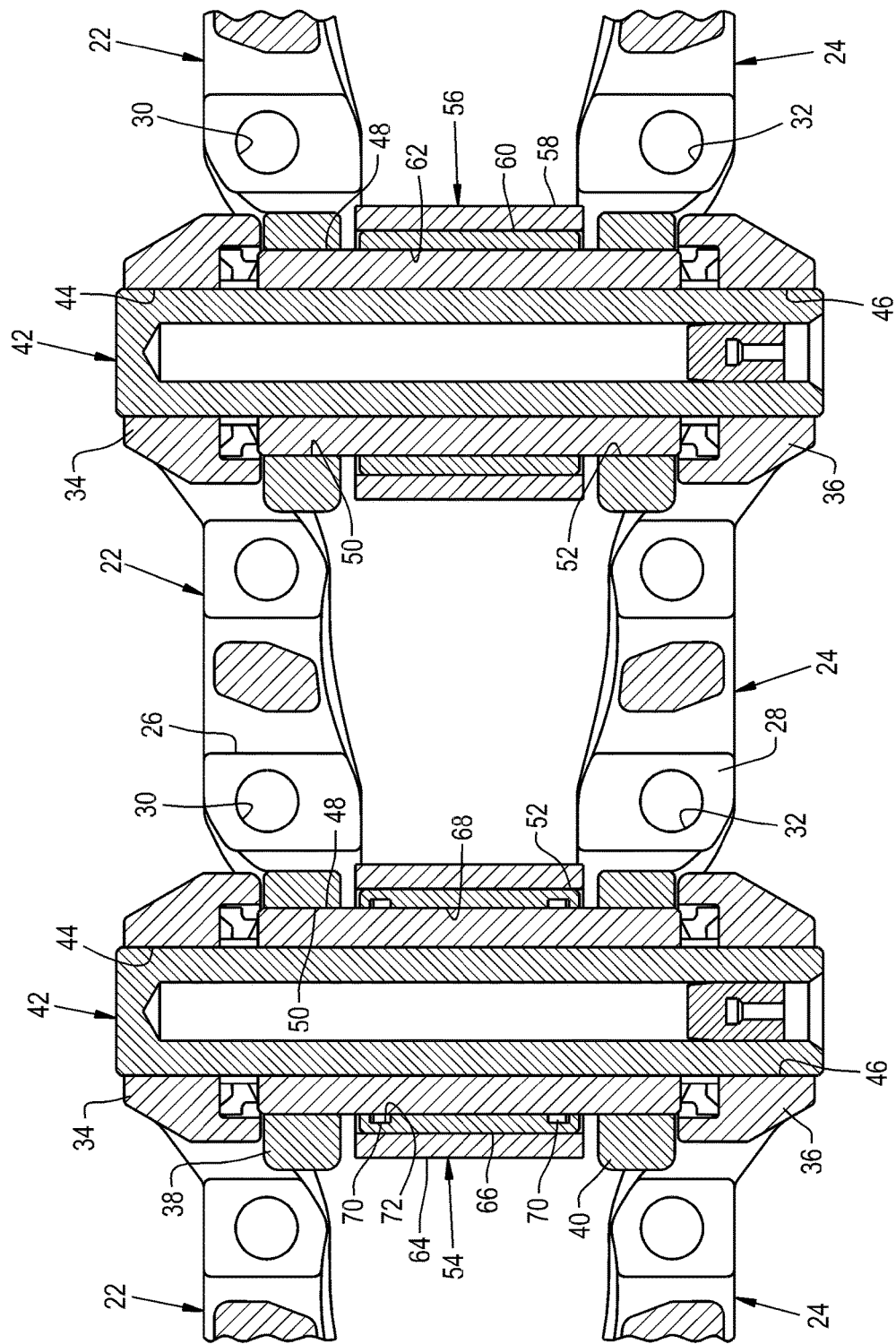
FIG. 2 is a fragmentary section view taken on lines 2-2 of FIG. 1.

As specifically shown in FIG. 2, the endless tracks 16 include links 22 and 24 having center sections 26 and 28, respectively. Holes 30 and 32 provide a means to fasten the shoes 18 to links 22 and 24 respectively. Link 22 has an outer section 34 connected to the center section 26. In corresponding fashion, link 28 has an outer section 36 fastened to center section 28. Link 26 has an inner section 38 that overlaps the adjacent outer section 34 of adjacent link 22. In like fashion, link 28 has an inner section 40 that overlaps with outer end section 36 of the adjacent link 24.

The links 22 and 24 are interconnected to form an endless track by track pins 42. Track pins 42 are received within bores 44 and 46 of outer end sections 34 and 36, respectively. Track pin pins 42 each have a wear sleeve 48 fixed to and positioned over the pin 42. Wear sleeves 48 are received within bores 50 and 52 of inner end portions 38 and 40 so that a pivoting movement between adjacent links can be accommodated.

Figure 3:
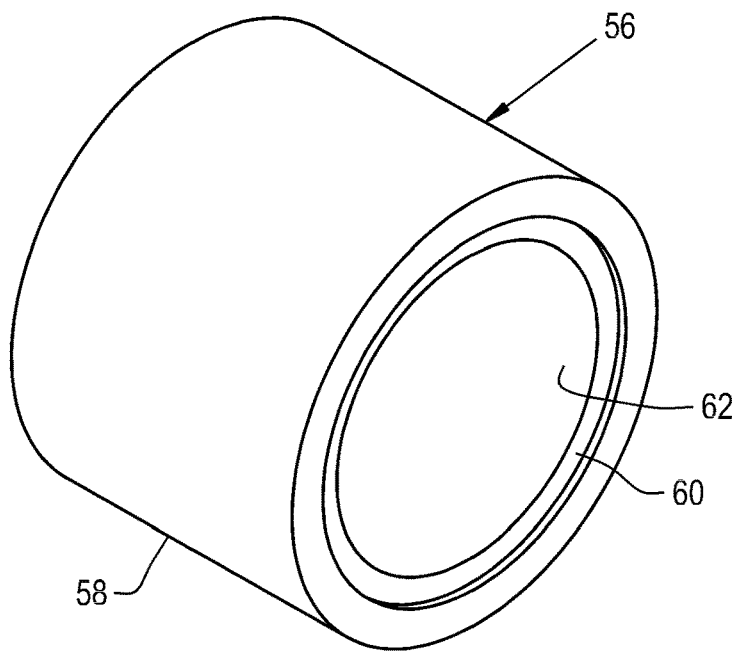
FIG. 3 shows a perspective view of a track bushing embodying the present invention.

In accordance with the present invention, the track bushings 54 or 56 are employed to greatly increase the longevity of the endless track assembly 10. Referring specifically to FIG. 3, track bushing 56 includes a steel sleeve 58 having sufficient thickness and strength to resist impact loads imposed during operation by the teeth 14 of sprocket 12. Preferably, steel sleeve 58 may be formed from SAE 4050 steel hardened to 50-55 HRC. It should be apparent however, that other high-strength steel materials may be employed for this purpose. Steel sleeve 58 forms an outer sleeve and an inner sleeve is formed of a composite bearing 60. Composite bearing 60 is fixed to the inside of steel sleeve 58, either by press fitting or by bonding. Composite bearing 60 has an internal diameter 62 that is sized to permit rotating movement relative to wear sleeve 48. Composite bearing 60 may be formed from composite bearing material having Teflon fibers and resin in and adjacent internal diameter 62 to provide superior lubricity. While these bearings may be available from many different sources, one source is found under the brand name Polylube IFR backed bearing.

Figure 4:
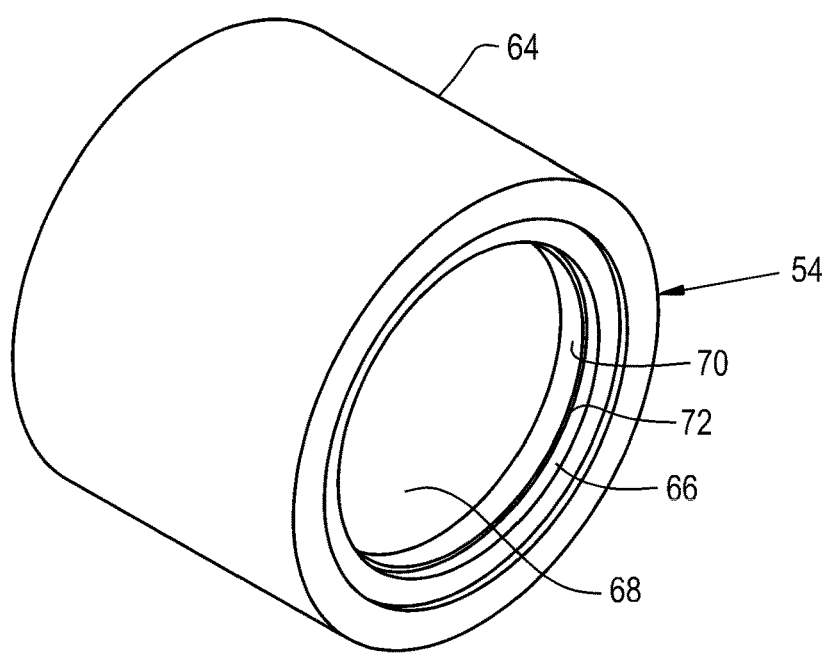
FIG. 4 shows a perspective view of another track bushing embodying another form of the present invention.

Referring to FIG. 4, an alternate track bushing 54 is illustrated. This track bushing 54 includes an outer high-strength steel sleeve 64 with properties like those of sleeve 58. A composite bearing 66 is fixed to the interior of outer sleeve 64 and has an internal diameter 68 sized to be received over wear sleeve 48 of track pin 42. Composite bearing 66 has properties like those of composite bearing 60 but has a pair of seals 70 received in annular grooves 72 adjacent the ends of internal diameter 68. Seals 70 may be formed from appropriate sealing material.

In operation, track bushing 56 is positioned over wear sleeve 48 and, because of composite bearing 60, is free to rotate on wear sleeve 48. This enables greatly increased service life. However, the composite bearing 60 has internal lubricity and is substantially less likely to seize or have premature failure than previous arrangements of lubricated bearings. Because composite bearing 60 has internal lubricity, it is far less likely to have a harmful effect on its ability to function in the dirt and debris laden environment typically experienced by the endless track. In like manner, the track bushing 54 has the same resistance to outside contaminants but has the added protection of the seals 70 preventing ingress of contaminants to the area between the composite bearing 66 and the wear sleeve 48.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A track bushing assembly for an endless track of a track type work machine, said track bushing assembly comprising:
   a pin;
   a bushing received over said pin and comprising an outer steel sleeve with sufficient thickness and strength to resist impact loading when in use; and
   an inner sleeve formed from composite bearing material fixed to the outer steel sleeve and having an internal diameter sized relative to said pin to permit rotation of said track machine relative to a pin component of the endless track over which said track bushing is positioned.

2. The track bushing assembly as claimed in claim 1, wherein the inner sleeve is bonded to said outer sleeve.

3. The track bushing assembly as claimed in claim 1, wherein the inner sleeve is press fit into the outer sleeve to fix it in place.

4. The track bushing assembly as claimed in claim 1, further comprising inner seals on the inner diameter of said inner sleeve adjacent the ends thereof.

5. The track bushing assembly as claimed in claim 1, wherein the inner sleeve is formed from a composite bearing material having polytetrafluoroethylene fibers and resin in and adjacent the internal diameter of said inner sleeve.

6. The track bushing assembly as claimed in claim 1, wherein the outer steel sleeve is formed from SAE 4050 steel hardened to approximately 50-55 HRC.

7. The track bushing assembly as claimed in claim 6, wherein the inner sleeve is formed from a composite bearing material having polytetrafluoroethylene fibers and resin adjacent its internal diameter.

8. An endless track for a track type work machine, said endless track comprising:
   a plurality of track links arranged end to end forming an endless track;
   a plurality of track pins for pivotally interconnecting said links and having an outer wear surface; and
   a track bushing positioned over and coaxial with each pin, said track bushing comprising an outer steel sleeve with sufficient thickness and strength to resist impact loading when in use and an inner sleeve formed from a composite bearing material fixed to the outer sleeve and having an internal diameter sized relative to each pin to permit rotation of said track bushing relative to the wear surface on said pin over which said track pin is positioned.

9. The endless track as claimed in claim 8, further comprising a sleeve fixed over said pin and providing the wear surface exposed to the internal diameter of said composite bearing material.

10. The endless track as claimed in claim 8, wherein the inner sleeve is bonded to said outer steel sleeve.

11. The endless track as claimed in claim 8, wherein said inner sleeve is pressed into said outer steel sleeve.

12. The endless track as claimed in claim 8, wherein said inner sleeve has annular seals on its inner diameter adjacent the ends thereof.

13. The endless track as claimed in claim 8, wherein the inner sleeve is formed from a composite bearing material having Teflon fibers and resin in and adjacent the internal diameter thereof.

14. The endless track as claimed in claim 8, wherein the outer sleeve is formed from SAE 4050 steel hardened to 50-55 HRC.

15. The endless track as claimed in claim 14, wherein the inner sleeve is formed from composite material having Teflon fiber and resin in and adjacent the internal diameter thereof.

16. The endless track as claimed in claim 8, further comprising a sprocket for engaging said plurality of track bushings and driving the endless track, said sprocket impacting and driving the outer diameter of the outer steel sleeve of said track bushing.

* * * * *